C. & G. STEPHENSON.
Seed Planter.
No. 13,530.
Patented Sept. 4, 1855.
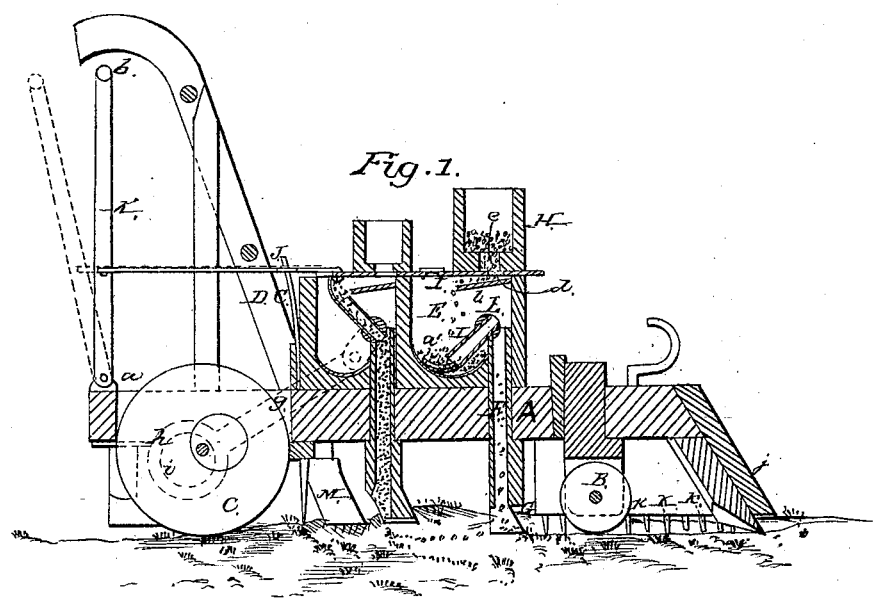
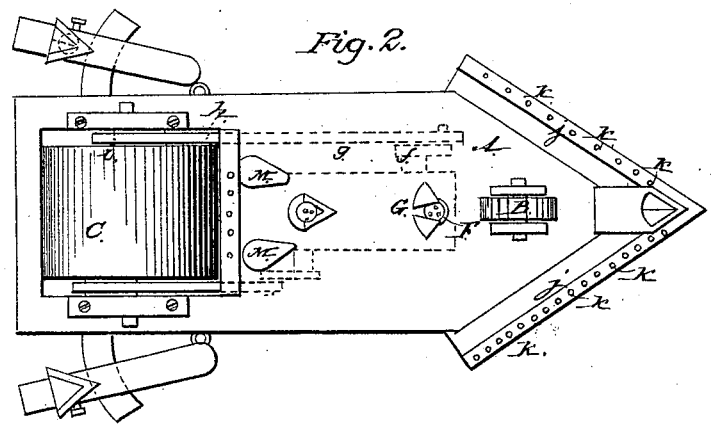

UNITED STATES PATENT OFFICE.

C. STEPHENSON AND G. STEPHENSON, OF PLAINFIELD, MASSACHUSETTS.

IMPROVEMENT IN SEEDING-MACHINES.

Specification forming part of Letters Patent No. 13,530, dated September 4, 1855.

*To all whom it may concern:*

Be it known that we, C. STEPHENSON and G. STEPHENSON, of Plainfield, in the county of Hampshire and State of Massachusetts, have invented a new and Improved Seeding-Machine; and we do hereby declare that the following is a full, clear, and exact description of the same, reference being had to the annexed drawings, making a part of this specification, in which—

Figure 1 is a longitudinal vertical section of our improvement. Fig. 2 is an inverted plan of same.

Similar letters of reference indicate corresponding parts in the two figures.

The nature of our invention consists in a peculiar distributing device or in the peculiar means employed for conveying the seed in suitable quantities from the hopper to the furrow, as will be presently shown and described.

To enable others skilled in the art to make and use our invention, we will proceed to describe its construction and operation.

A represents a platform or framing supported at the front end by a wheel, B, placed at the center of the frame, and at the back end by a roller, C.

D D are two handles attached to the back part of the platform or framing.

E represents a rectangular box placed upon the platform or framing A, and F is a conveying-tube, which passes into the lower part of the box, the lower end of the tube F having a share, G, attached to it or formed upon it. The upper end of the tube passes through the bottom of the box near its front end, as shown in Fig. 1, and the bottom of the box is of concave form.

On the upper part of the box E there is placed a hopper, H, between which and the box E there is fitted a slide, I. This slide is connected by a rod, J, to a lever, K, the lower end of which works on a pin or rod, $a$, on the back part of the framing or platform A. The upper end of the lever K has a bar, $b$, passing transversely through it. The rod J has a spring, $c$, connected to it, and the slide I has a hole, $d$, made through it, which hole is kept partially under a hole, $e$, in the bottom of the hopper H by the spring. (See Fig. 1.)

L represents a shaft, which is placed transversely in the box E. One end of this shaft projects through the side of the box E, and has a crank, $f$, attached to it. (See dotted lines, Fig. 2.) To the end of the crank $f$ one end of a connecting-rod, $g$, is attached, the opposite end of the rod having an eye or strap, $h$, upon it, which eye or strap works over a circular projection, $i$, on one end of the roller, said projection being placed eccentric with the roller, as shown by the dotted lines in Fig. 1. The shaft L has a tube, L′, inserted in it, one end of which is provided with a curved plate, $a'$, of a suitable length and breadth. The tube passes transversely through the shaft L, and its inner end is directly over the upper end of the conveying-tube F, as shown in Fig. 1.

The front end of the platform or framing A is pointed, so as to form oblique ends or sides, to which strips or planks $j j$ are secured, said strips or planks having small teeth $k$ at their lower edges.

M M are covering-shares attached to the back part of the framing or casing behind the tube F.

Operation: The seed to be planted is placed in the hopper H, and as the machine is drawn along the seed passes through the holes $d$ $e$ in the hopper H and slide I. The seed falls upon a deflecting-plate, $l$, underneath the slide I, and then falls upon the concave bottom of the box E. The connecting-rod $g$, eccentric projection $i$, and crank $f$ give a reciprocating motion to the shaft L, and the tube L′ consequently works up and down within the box E. As the tube passes upward the plate $a'$ will scoop up a quantity of seed, which, as the tube approaches a vertical position, passes down by its own gravity through the tube L′ and into the conveying-tube F, and through the tube F into the furrow made by the share G. The seed is thus taken from the box E and thrown or carried into the upper end of the tube F in suitable quantities. The supply of seed in the box E is regulated by adjusting the slide I by operating the lever K by hand. The shares M M cover the seed with earth, and the roller C presses the earth upon the seed.

In the drawings two distributing devices are represented—one for seed and the other for manure; but they are precisely similar in construction. The teeth $k$ smooth the ground and remove obstructions from the path of the share G.

Having thus described our invention, what we claim as new, and desire to secure by Letters Patent, is—

Distributing or conveying the seed from the box E to the conveying-spout F by means of the tube L' with plate $a'$ attached, the tube being secured within a shaft, L, which has a reciprocating rotary motion, substantially as shown and described.

C. STEPHENSON.
GEO. STEPHENSON.

Witnesses:
DAVID SHEAD,
FRED E. CAMPBELL.